US008985309B2

(12) United States Patent
Drenguis

(10) Patent No.: US 8,985,309 B2
(45) Date of Patent: Mar. 24, 2015

(54) DEVICE FOR TRANSPORTING BOTTLES OR SIMILAR CONTAINERS

(75) Inventor: Alfred Drenguis, Börnsen (DE)

(73) Assignee: KHS GmbH, Dortmund (DE)

( * ) Notice: Subject to any disclaimer, the term of this patent is extended or adjusted under 35 U.S.C. 154(b) by 33 days.

(21) Appl. No.: 13/520,216

(22) PCT Filed: Dec. 2, 2010

(86) PCT No.: PCT/EP2010/007311

§ 371 (c)(1), (2), (4) Date: Jul. 2, 2012

(87) PCT Pub. No.: WO2011/101007

PCT Pub. Date: Aug. 25, 2011

(65) Prior Publication Data

US 2012/0279611 A1 Nov. 8, 2012

(30) Foreign Application Priority Data

Feb. 17, 2010 (DE) ........................ 10 2010 008 387

(51) Int. Cl.
*B65G 29/00* (2006.01)
*B08B 9/20* (2006.01)

(52) U.S. Cl.
CPC ..................................... *B08B 9/205* (2013.01)
USPC ............................ 198/404; 198/406; 198/403

(58) Field of Classification Search
CPC ....................................................... B08B 9/205
USPC ............................................... 198/803.3, 404
See application file for complete search history.

(56) References Cited

U.S. PATENT DOCUMENTS

| | | | | |
|---|---|---|---|---|
| 3,961,705 | A * | 6/1976 | Suciu | 198/402 |
| 4,104,081 | A * | 8/1978 | Totten | 134/23 |
| 5,253,910 | A * | 10/1993 | Perrier | 294/116 |
| 5,277,207 | A * | 1/1994 | Perrier | 134/44 |
| 6,905,012 | B2 * | 6/2005 | Lopes | 198/404 |
| 6,945,260 | B1 * | 9/2005 | Stocchi et al. | 134/62 |
| 7,311,515 | B2 * | 12/2007 | Netsu | 425/534 |
| 7,857,117 | B2 * | 12/2010 | Menke et al. | 198/403 |
| 2004/0025909 | A1 * | 2/2004 | Lopes | 134/62 |
| 2009/0120530 | A1 * | 5/2009 | Kelley et al. | 141/8 |
| 2010/0276028 | A1 * | 11/2010 | Sangi et al. | 141/1 |
| 2011/0182710 | A1 * | 7/2011 | Fahldieck et al. | 414/758 |
| 2012/0227774 | A1 * | 9/2012 | Pongolini | 134/57 R |

FOREIGN PATENT DOCUMENTS

| | | |
|---|---|---|
| DE | 29819334 | 4/1999 |
| DE | 102006022465 | 11/2007 |
| JP | 2001-340821 | 12/2001 |
| WO | 2005/080013 | 9/2005 |

* cited by examiner

*Primary Examiner* — Gene Crawford
*Assistant Examiner* — Thomas Randazzo
(74) *Attorney, Agent, or Firm* — Occhiuti & Rohlicek LLP

(57) ABSTRACT

The invention relates to a device for transporting bottles or similar containers between a transfer position and a discharge position, comprising a transport element that may be driven in a rotating manner about at least one vertical machine axis and several container receptacles provided on the transport element and having, for example, a gripper-like design for picking up and holding in each case one container during the transport thereof from the transfer position to the discharge position.

16 Claims, 4 Drawing Sheets

DEVICE FOR TRANSPORTING BOTTLES OR SIMILAR CONTAINERS

CROSS REFERENCE TO RELATED APPLICATIONS

This application is the national stage application of PCT/EP2010/007311, filed Dec. 2, 2010, which claims priority to German application no. 10 2010 008 387.9, filed Feb. 17, 2010. The contents of the foregoing applications are incorporated herein in their entirety.

FIELD OF INVENTION

The invention relates to devices for transporting containers, and in particular, to devices that turn containers upside-down during transport thereof.

BACKGROUND

A known device for transporting bottles or other containers is a transport-star having container receptacles on a periphery of a rotor that can be driven to rotate about a vertical machine axis. The containers are each individually transferred to these container receptacles at a transfer position from an upstream machine or an upstream plant component. As the rotor rotates, the containers are then transported, while being held at the respective container receptacles, to a discharge position where they are passed to a further machine or plant component.

In the course of being transported on the transport path between a first machine or plant component and a second machine or plant component, the containers sometimes have to be turned. For example, containers that are treated in a rinser in an inverted position or inverted orientation must be turned back to their normal attitude and transferred in that normal attitude to a filling machine.

SUMMARY

The object of the invention is a device that, while simplified in design and compact in overall size, enables not only the transporting of the containers from a transfer position to a discharge position but that, at the same time, and on a transport path, also facilitates a swinging of the containers about an axis that is perpendicular to the container axis.

As used herein, “container axis” means the vertical axis of the containers and is also usually the axis of the container opening of the respective container.

As used herein, “inverted position” or “inverted orientation” mean a container orientation in which the opening of the container points downward.

As used herein, “normal attitude” or “normal orientation” is a container orientation in which the container opening points upward.

Preferably, the inventive device is configured in such a way that the container receptacles, which are preferably formed of container grippers, are pivoted from an initial position through 180° in a first direction on the transport path, which is the direction between the transfer position and the discharge position, and then are pivoted back through 180° on the remainder of the transport path, which is the portion that is between the discharge position and the transfer position, i.e. the container receptacles are pivoted in an opposite second direction so that each container receptacle is back in its initial position at the transfer position.

In a preferred embodiment, the lifting and pivoting movements are each controlled by curves, and hence positively controlled synchronously with the motion of the container receptacles.

The extents of the lifting movements are preferably equal or essentially equal to the size of the containers along their container axis. The lifting and pivoting movements are preferably coordinated with one another so that each container is pivoted about an axis that intersects the container axis at, or essentially at, its center.

Further embodiments, advantages and possible applications of the invention arise out of the following description of embodiments and out of the figures. All of the described and/or pictorially represented attributes whether alone or in any desired combination are fundamentally the subject matter of the invention independently of their synopsis in the claims or a retroactive application thereof. The content of the claims is also made an integral part of the description.

BRIEF DESCRIPTION OF THE DRAWINGS

The invention is explained in detail below through the use of an exemplary embodiment and with reference to the figures, in which.

DETAILED DESCRIPTION

Figure 1:
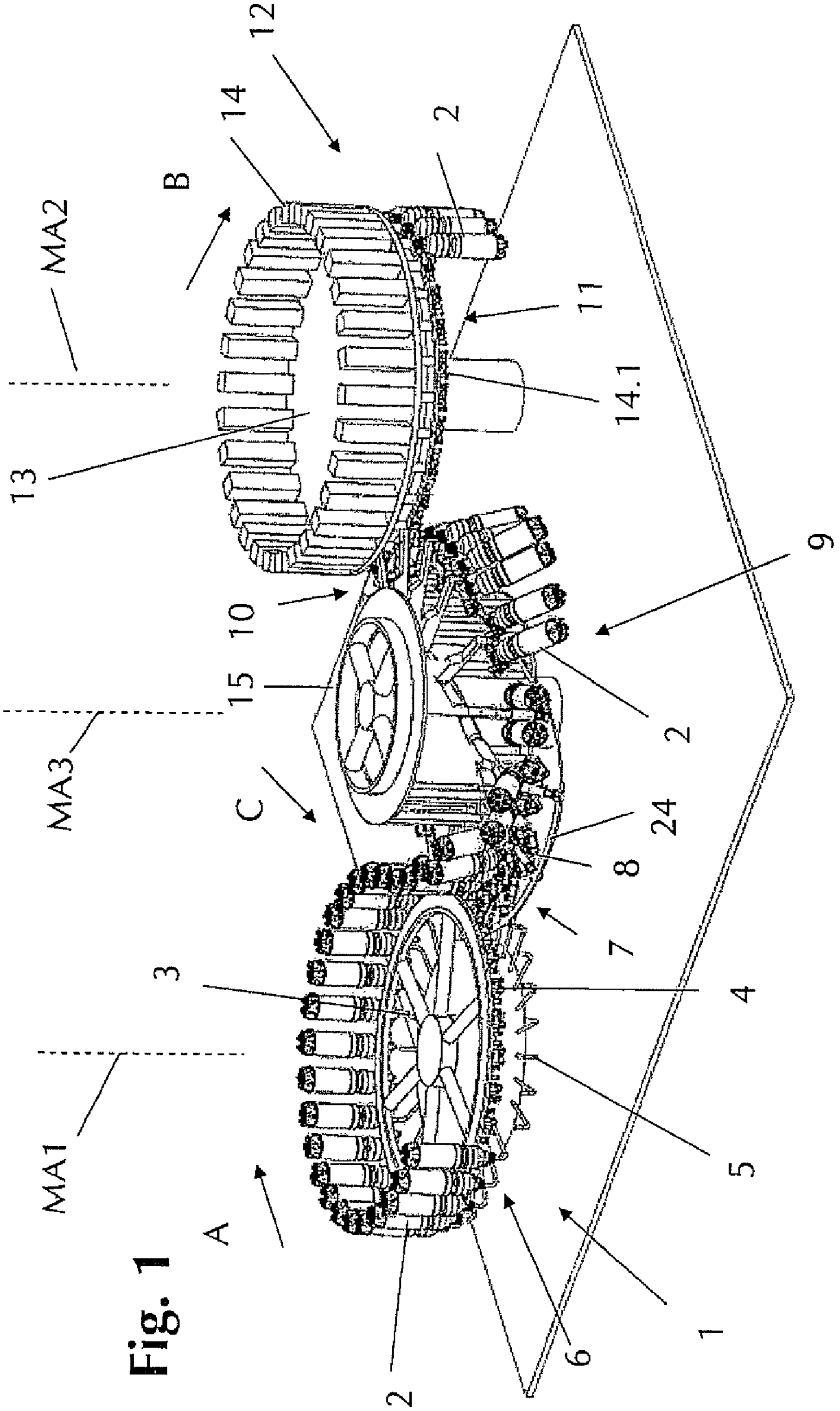
FIG. 1 shows in a simplified perspective functional representation a rinser and a filling machine for containers in the form of bottles, together with a conveyor of the transport star wheel type arranged between these machines or plant components for transferring the bottles from the rinser to the filling machine.
Figure 2:
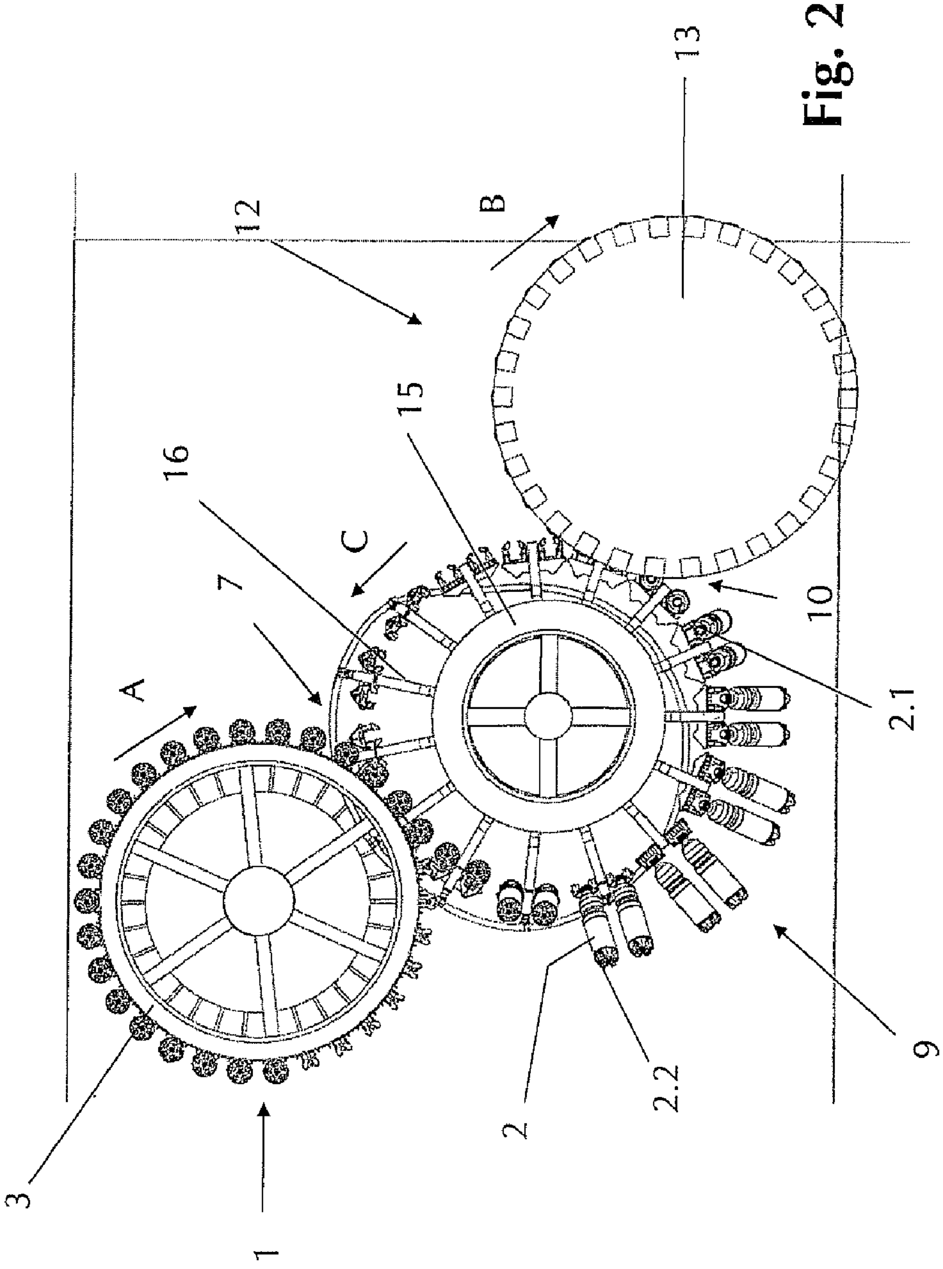
FIG. 2 shows the rinser, the filling machine and the conveyor of FIG. 1 in plan view.

FIG. 1 shows a rotary rinser 1, for example a wet and/or dry rinser, for treating or for rinsing, cleaning and/or disinfecting the interior of bottles 2 using a liquid and/or dry treatment medium. The rotary rinser 1 has a rinser rotor 3 that can be driven to rotate about a vertical rinser axis MA1 in the direction of arrow A. Treatment stations 6 are disposed on a periphery of the rinser rotor 3. The treatment stations 6 are mutually spaced apart from each other at equal angular distances. Each treatment station 6 has a gripper-like bottle holder 4 and a treatment nozzle 5 for discharging liquid or gaseous and/or vaporous treatment medium into a bottle 2.

As shown in FIG. 1, at the treatment positions 6, bottles 2 are oriented in an inverted position, i.e. with the container axis or bottle axis orientated vertically and therefore parallel to the rinser axis MA1 of the rotary rinser 1 with the bottle's opening 2.1 pointing downward and its base 2.2 pointing upward. Bottles 2 are transferred in this orientation to the individual treatment positions 6 via a container or bottle entry (not shown). The turning of bottles 2 from their original normal attitude into the inverted position takes place, for example, in the region of the bottle or container entry.

After bottles 2 have been treated, the rinser rotor 3 passes them on to a transfer position 7.

At the transfer position 7, a bottle gripper 8 of a transport star conveyor 9 picks up and grips the bottle 2. The transport star conveyor 9 transports the bottle towards a discharge position 10 where the bottle 2 is transferred to a treatment position 11 of a filling machine 12. As the transport star conveyor 9 transports the bottle, it also restores the bottle 2 to its normal attitude.

The filling machine 12 has a filling-machine rotor 13 that can be driven to rotate about a vertical filling- machine axis MA2 of the filling machine 12 in the direction of arrow B. Treatment positions 11 are disposed on a periphery of the filling-machine rotor 13. The treatment positions 11 are spaced apart from each other at equal angular distances. Each treatment position 11 includes a container carrier 14.1 for suspending a bottle 2 under a filling element 14 by its mouth flange 2.3, which is beneath bottle mouth 2.1, for the controlled filling of the bottle 2 with a liquid filling material.

The transport star conveyor 9 includes a conveyor rotor 15 that can be driven to rotate about a vertical conveyor axis MA3 in the direction of arrow C and hence opposite to the direction of rotation of the rinser rotor 3 and the filling-machine rotor 13 (arrows A and B respectively). Bottle grippers 8 are provided on a periphery of the conveyor rotor 15. These bottle grippers 8 are configured, for example, like tongs having two gripping or clamping jaws that are movable relative to one another and that are pre-tensioned by a spring into a closed position.

At the transfer position 7, a bottle gripper 8 clamps a bottle 2 between the bottle's neck and mouth flange 2.3.

The gripper 8 maintains its grip as the bottle swings into its normal attitude during rotation of the conveyor rotor 15 until the bottle 2 reaches discharge position 10 where it is transferred to a container carrier 14 of a treatment position 11 of the filling machine 12. A controller (not shown) opens the bottle gripper at the transfer position 7 to receive a bottle 2 from the rotary rinser 1 and then opens it again at the discharge position 10 to transfer the bottle 2 to the filling machine 12.

Figure 3:
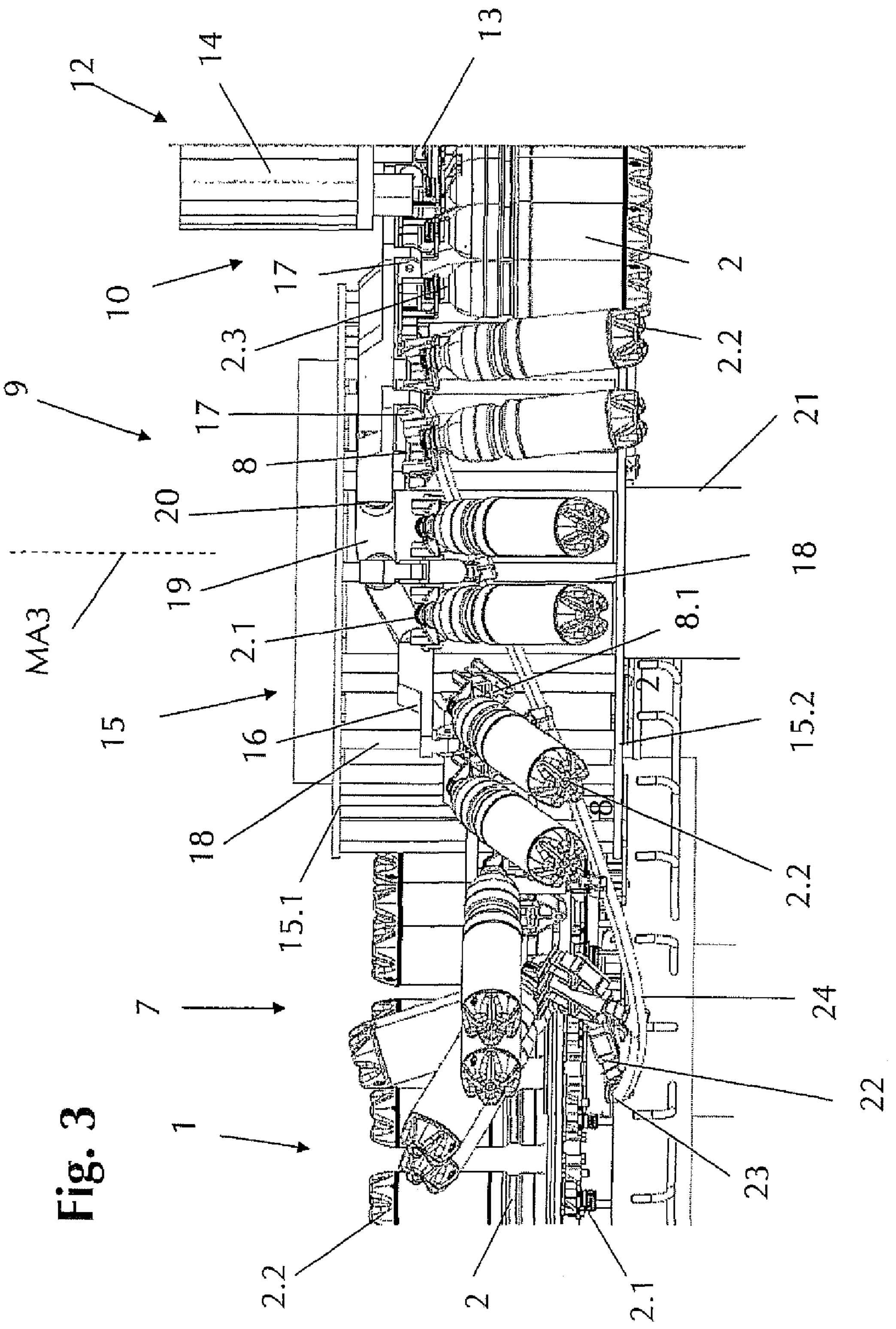
FIGS. 3 and 4 show respectively an enlarged side view and a plan view of the conveyor of the transport star wheel type shown in FIG. 1.
Figure 4:
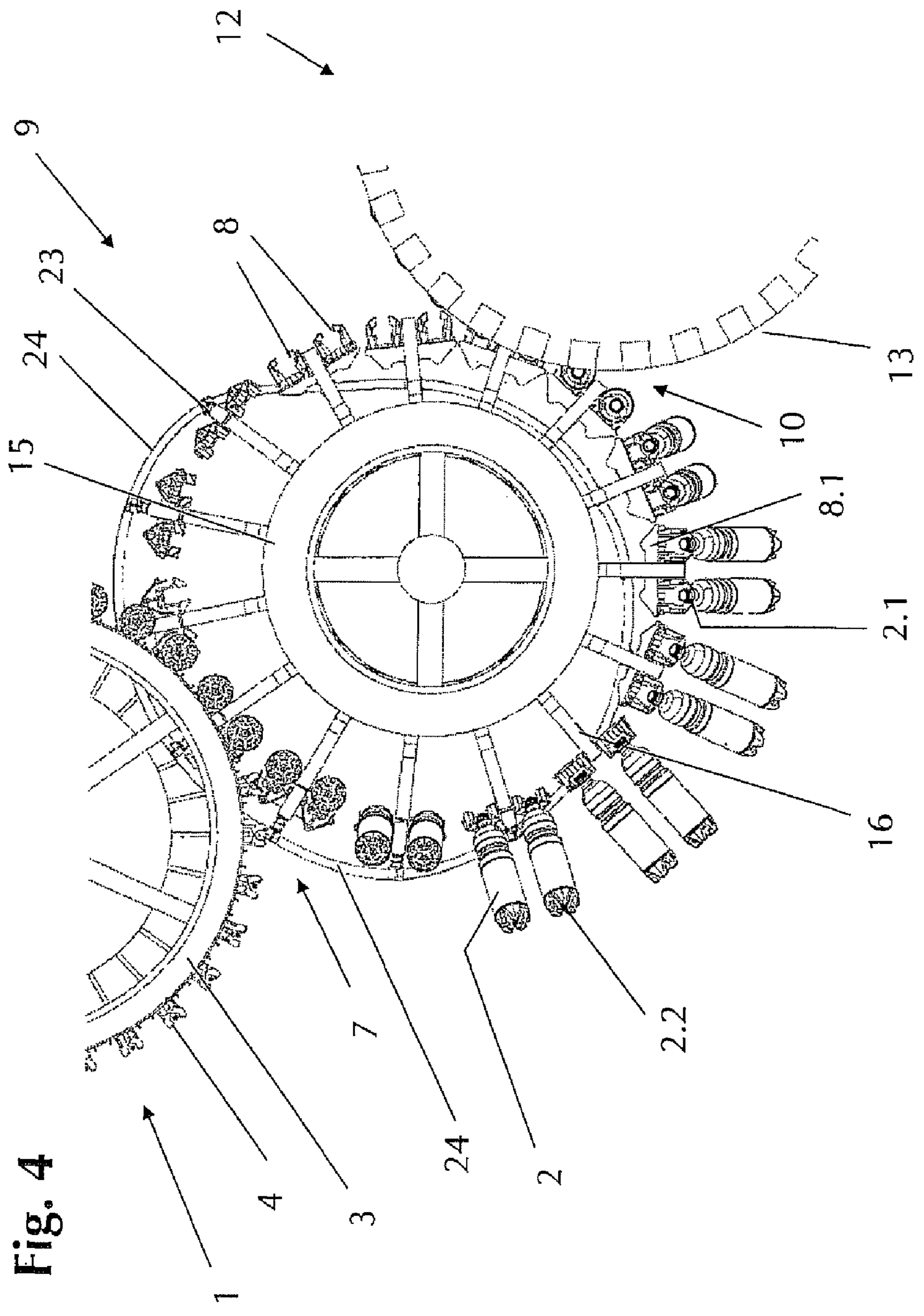

Referring to FIGS. 3 and 4, in the depicted embodiment of a transport star conveyor 9, the bottle grippers 8 are provided in pairs. The bottle grippers 8 in each pair are on a common plate 8.1, or auxiliary carrier. Each pair of bottle grippers 8 is pivotable with the common plate 8.1 on a bottle-gripper carrier 16 about a common axis that is formed by the axis a pivot pin 17. This pivoting axis is oriented tangentially to the periphery or direction of rotation of the conveyor rotor 15 or to a notional circular cylinder concentrically surrounding the conveyor axis MA3 of the conveyor rotor 15.

Each bottle gripper carrier 16 is provided on a guide bar 18, best seen in FIG. 3. The guide bar 18 guides the bottle-gripper carrier 16 during its vertical displacement, i.e. its displacement in a direction parallel to the conveyor axis MA3, on the periphery of the conveyor rotor 15.

Each guide bar 18 is offset radially inwards from its corresponding gripper carrier 16. Each guide bar 18 extends between an upper rotor element 15.1 and a lower rotor element 15.2 of the conveyor rotor 15. As a result, the conveyor rotor 15 is in the form of a circular cage that offers high strength or stability despite its relatively lightweight construction.

The guide bars 18 are also provided in pairs and with one guide bar 18 of a pair being radially offset relative to the other guide bar 18 of the pair. Thus, two guide bars 18 cooperate to guide one bottle-gripper carrier 16. Each bottle-gripper carrier 16 can therefore be moved vertically on the guide formed by the two guide bars 18 without twisting as it does so.

As the figures show, in the case of the depicted embodiment, the bottle gripper carriers 16 are arm-like in configuration so that, relative to the conveyor axis MA3, they project with their longitudinal extension radially outward from the two guide bars 18. An articulating joint provides engagement between the bottle grippers 8, with their auxiliary carriers or plates 8.1, and the distal end of the arm formed by a bottle gripper carrier 16. This enables the bottles to pivot, as shown in FIG. 3.

A static first control curve 19, i.e. one that does not rotate with the conveyor rotor 15, and curve rollers 20 that engage the first control curve 19 and that are mounted on bottle gripper carriers 16 so as to be able to rotate freely, cooperate to compel the bottle gripper carriers 16 to move vertically up and down along their respective guide bars 18 as the conveyor rotor 15 rotates.

In the case of the depicted embodiment, the first control curve 19 is shaped in a way such that a bottle gripper carrier 16 is in its lowest travel position at the transfer position 7 and climbs to its highest travel position at the discharge position 10 as the conveyor rotor 15 rotates. Consequently a bottle gripper carrier 16 climbs as it traverses the angular range of rotor motion between the transfer position 7 and the discharge position 10. On its way back to the transfer position 7, as it traverses the angular range from the discharge position 10 back to the transfer position 7, the first control curve 19 compels the bottle gripper carrier 16 to descend back to its lowest travel position. To this end, the first control curve 19 has a rising profile on the path between the transfer position 7 and the discharge position 10 and a falling profile on the path between the discharge position 10 and the transfer position 7.

The static first control curve 19 is disposed within the area of movement in which guide bars 18 move as the rotor rotates. It is also attached to a central pillar 21, which does not rotate with the rotor and which is also disposed within the area of movement of guide bars 18 and on the same axis as the conveyor axis MA3. This is made possible because the lower rotor element 15.2 is configured as a ring that concentrically surrounds the conveyor axis MA3 and that is connected, by guide bars 18, to the upper spoked-wheel-like rotor section 15.1.

Curve rollers 20 are each located at the radially inner end of bottle gripper carriers 16 at a short distance from guide bars 18 and hence at a short distance from sliding bushes by which bottle gripper carriers 16 are guided on the guide bars, thus creating optimum drive conditions. The two bottle grippers 8 of each bottle gripper pair are provided on the common plate 8.1 by which the two bottle grippers 8 of each bottle gripper pair are provided so as to be able to pivot on bottle gripper carrier 16 about the common horizontal pivoting axis that is orientated tangentially to the rotation direction (arrow C) of the conveyor rotor 15 and that is constituted essentially by a pivot pin 17.

A control arm 22 is attached by one end to each plate 8.1 between the two bottle grippers 8 such that this control arm is oriented with its longitudinal extension radial to the respective pivoting axis (which is formed by the pivot pin 17) of the plate 8.1. At its end lying away from its associated plate 8.1, each control arm 22 is configured with a guide piece 23 that engages over a second control curve 24 like a fork. This second control curve 24 is static, i.e. it does not rotate with the conveyor rotor 15.

The second control curve 24 is formed in the depicted embodiment by a tubular section, with the guide piece being guided during its displacement on the second control curve 24. In order to ensure a secure engagement of the respective guide piece in second control curve 24, each control arm 22 in the depicted embodiment is configured telescopically with an axially acting spring assembly that urges the associated guide piece 23 against second control curve 24.

The path followed by second control curve 24 defines a spiral that encloses the trajectory of the pivot pin 17 at a distance therefrom. The spiral has a half turn, or a 180° turn, between the transfer position 7 and the discharge position 10 and another half turn, or 180° turn, in the opposite direction between the discharge position 10 and the transfer position 7. The distance between the second control curve 24 and the trajectory of the pivot pin 17 is equal to the length of the control arms 22.

The second control curve 24 is further configured so that, on the transport path between the transfer position 7 and the discharge position 10, the containers are first swung outward with their container base and then are swung back inward again relative to the conveyor axis MA3, preferentially in such a way that, half-way along the transport path or angular range of the rotational motion of the conveyor rotor 15 between transfer position 7 and discharge position 10, each bottle 2 is oriented with its bottle axis radial or approximately radial to the conveyor axis MA3.

As the conveyor rotor 15 rotates, interaction between the control arms 22 and the second control curve 24 forces the bottle grippers 8 to pivot 180° about the pivoting axis of the associated pivot pin 17. As a result, the bottles 2, which at transfer position 7 are initially received by the bottle grippers 8 in the inverted position, are swung back to their normal attitude as they move toward the discharge position 10.

The first and second control curves 19 and 24 are preferably coordinated with one another so that the lifting motion, which is controlled by the first control curve 19, and the pivoting motion of the bottle grippers 8 about their pivoting axes or pivot pins 17, which is controlled by the second control curve 24, produce a resulting motion such that, during the transport from the transfer position 7 to the discharge position 10, i.e. over the corresponding angular range of the rotational movement of the conveyor rotor 15, each bottle 2 is effectively pivoted about its bottle center, i.e. about an axis that intersects the respective bottle axis at its center. In addition to the general advantage of a compact design and the swinging of bottles 2 back to their normal attitude, another advantage of this configuration is that there is practically no height offset between the bottles 2 at the rotary rinser 1 and bottles 2 at the filling machine 12.

In the depicted embodiment, the second control curve 24 specifically follows a path such that the longitudinal extension of each control arm 22 is radially oriented to the conveyor axis MA3 at the transfer position 7 and the discharge position 10. In the depicted embodiment, the second control curve 24 is moreover configured such that it has a different vertical height level at the transfer position 7 and at the discharge position 10. In particular, the second control curve 24 is configured such that, at the transfer position 7, it has a lower height level, and at the discharge position 10, it is a higher height level. The lower height level at the transfer position 7 corresponds roughly to the lower level or initial position of the bottle grippers 8 at the transfer position 7. The higher height level at the discharge position 10 roughly corresponds to the higher level of bottle grippers 8 at the discharge position 10.

In the direction of rotation C of the conveyor rotor 15, the height level of the second control curve 24 first rises vertically from the transfer position 7 to the discharge position 10 and then falls back from the discharge position 10 to the transfer position 7 to the lower height level. The second control curve 24 also follows a path such that the radial distance from the conveyor axis MA3 at the transfer position 7 is greater than that at the discharge position 10 by twice the length of control arms 22.

The rinser rotor 3, the filling-machine rotor 13, and the conveyor rotor 15 are driven synchronously in such a way that whenever a treatment position 6 of the rotary rinser 1 has reached the transfer position 7, a bottle gripper 8 also stands ready there, and whenever a bottle gripper 8 has reached the discharge position 10, a container carrier 14.1 also stands ready there to receive the bottle 2.

The invention has been described hereinbefore by reference to one embodiment. Numerous variations as well as additions are possible without departing from the inventive concept underlying the invention.

LIST OF REFERENCE NUMERALS

1 Rotary rinser
2 Bottle
2.1 Bottle opening
2.2 Bottle base
2.3 Mouth flange
3 Rinser rotor
4 Bottle holder or bottle gripper on rinser 1
5 Treatment nozzle
6 Treatment position at rinser 1
7 Transfer position between rinser and conveyor 9
8 Bottle gripper
8.1 Plate for two bottle grippers 8
9 Conveyor
10 Discharge position
11 Treatment position at filling machine 12
12 Filling machine
13 Filling machine rotor
14 Filling element
14.1 Container carrier
15 Conveyor rotor
15.1 Upper rotor element
15.2 Lower rotor element
16 Bottle gripper carrier
17 Pivot pin
18 Guide bar
19 First control curve
20 Curve roller
21 Central pillar
22 Control arm
23 Guide piece
24 Second control curve
A A Direction of rotation of rotor 3
B Direction of rotation of rotor 13
C Direction of rotation of rotor 15
MA1 Vertical rinser axis 1
MA2 Vertical filling machine axis
MA3 Vertical conveyor axis

The invention claimed is:

1. An apparatus comprising a device for transporting containers between a transfer position and a discharge position, said device for transporting containers comprising a transport element, container receptacles, a first control curve, a second control curve, and guide pieces, wherein said transport element is configured to be driven to rotate about a vertical machine axis, wherein said container receptacles are provided on said transport element, wherein each of said container receptacles is configured as a gripper, wherein each of said grippers is configured for picking up and holding a container during transport thereof from said transfer position to said discharge position, wherein said first control curve lifts each gripper along an axis parallel to said machine axis, wherein said second control curve and said guide pieces cooperate to cause controlled pivoting of each container receptacle out of an initial position thereof, wherein said controlled pivoting comprises pivoting about a pivoting axis that is oriented square to said machine axis between said transfer position and said discharge position, wherein said second control curve and said guide pieces cooperate in causing controlled return pivoting of each container receptacle into said initial position about said pivoting axis between said discharge position and said transfer position, wherein said second control curve defines a path selected from the group consisting of a coil and a spiral, wherein said path surrounds a trajectory of said pivoting axes, and wherein said first and second control curves and said guide pieces are configured synchronously with movement of said grippers for controlling said lifting and pivoting, whereby said containers are lifted and pivoted concurrently.

2. The apparatus of claim 1, wherein said transport element comprises a rotor configured to be driven to rotate about said vertical machine axis.

3. The apparatus of claim 1, wherein relative to said vertical machine axis, said second control curve runs radially outside a trajectory of guides for lifting movement of a structure selected from the group consisting of said container receptacles and carriers thereof.

4. The apparatus of claim 1, wherein said lifting movement and said pivoting of said container receptacles are coordinated having regard to a size that said containers exhibit on container axes thereof so that said containers are pivoted about a central axis running square to said container axes.

5. The apparatus of claim 1, wherein a maximum stroke of said lifting movement is equal or approximately equal to a size that a container exhibits on a container axis thereof.

6. The apparatus of claim 1, wherein a path of a control curve selected from the group consisting of said first control curve and said second control curve is selected such that, at said transfer position, said container receptacles are at a lower lifting position to receive containers, and at said discharge position, said container receptacles are in an upper lifting position to discharge said containers, wherein at said transfer position, said containers are in an inverted position, and wherein, at said discharge position, said containers are in a normal attitude.

7. The apparatus of claim 1, further comprising a common auxiliary carrier configured for controlled pivoting about said pivoting axis, wherein two container receptacles are provided on said common auxiliary carrier.

8. The apparatus of claim 1, wherein at least one of said guide pieces interacting with said at least one second control curve is on a control arm that projects radially away from the pivoting axis from one of a respective container receptacle and a respective auxiliary carrier.

9. The apparatus of claim 1, further comprising a first plant component for cleaning said containers, and a second plant component for filling said containers with liquid filling material, wherein said device is disposed to function as a conveyor to convey said containers from said first plant component to said second plant component.

10. The apparatus of claim 1, wherein said second control curve surrounds said trajectory of said pivoting axes with a partial turn corresponding to a pivoting angle of said container receptacles, and wherein a turn direction between said discharge position and said transfer position is opposite to a turn direction between said transfer position and said discharge position.

11. The apparatus of claim 10, wherein said partial turn is a half turn.

12. The apparatus of claim 1, wherein said first control curve is arranged inside a trajectory of a structure selected from the group consisting container receptacles and carriers thereof.

13. The apparatus of claim 12, wherein, relative to said vertical machine axis, said second control curve runs radially outside a trajectory of guides for lifting movement of a structure selected from the group consisting of said container receptacles and carriers thereof

14. The apparatus of claim 1, wherein a structure selected from a group consisting of said container receptacles and auxiliary carriers carrying said container receptacles is configured to pivot about said pivoting axis on a carrier that is provided on the first control curve such that said structure is displaceable on said transport element for lifting movement in an axial direction parallel to said machine axis.

15. The apparatus of claim 14, wherein said transport element comprises a central machine element, guide bars, and a rotor wherein said rotor comprises an upper rotor element and a lower rotor element, wherein said upper rotor element is rotatably mounted on said central machine element, wherein said lower rotor element comprises a ring enclosing said central machine element, wherein said guide bars interconnect said upper and lower rotor elements to form a cage, and wherein said guide bars form a guide for said carriers of said container receptacles.

16. The apparatus of claim 15, wherein said central machine element comprises a pillar.

* * * * *